United States Patent

[11] 3,609,104

| [72] | Inventors | John E. Ehrreich<br>Watertown;<br>Adrian R. Reti, Cambridge, both of Mass. |
|---|---|---|
| [21] | Appl. No. | 705,593 |
| [22] | Filed | Feb. 15, 1968 |
| [45] | Patented | Sept. 28, 1971 |
| [73] | Assignee | Ercon, Inc.<br>Cambridge, Mass. |

[54] ELECTRICALLY CONDUCTIVE GASKET AND MATERIAL THEREOF
30 Claims, No Drawings

[52] U.S. Cl. .................................................. 252/511, 252/512, 260/41 R, 260/41 B
[51] Int. Cl. ...................................................... H01b 1/06, C08f 1/84
[50] Field of Search ............................................ 252/510, 511, 512–515; 260/41 B

[56] References Cited
UNITED STATES PATENTS

| 2,042,606 | 6/1936 | Kotowski | 252/511 |
|---|---|---|---|
| 2,868,759 | 1/1959 | Bechu | 260/41 B |
| 3,056,750 | 10/1962 | Pass | 252/511 |
| 3,356,634 | 12/1967 | McGinley | 260/41 |
| 3,412,043 | 11/1968 | Gilliland | 252/514 |
| 3,458,596 | 7/1969 | Faigle | 260/41 |

Primary Examiner—Douglas J. Drummond
Attorney—Cesari and McKenna

ABSTRACT: An article loaded with a filler providing good electrical or heat conductivity is formed by mixing the filler with particles of nonflowing compressible resin, as well as a sufficient amount of flowable resin. The flowable resin is then hardened. The nonflowing resin particles concentrate the filler particles in a network of high conductivity pathways and in this way they provide high conductivity in the macrostructure with a very low overall concentration of filler particles; and at the same time they enhance the resilience of the finished article. They also prevent settling of the filler particles prior to hardening, thereby maintaining a fairly homogeneous dispersion of the filler.

3,609,104

ELECTRICALLY CONDUCTIVE GASKET AND MATERIAL THEREOF

BACKGROUND OF THE INVENTION

1. Field of the Invention

This invention relates to a method of making conductive plastic articles. More particularly, it relates to the manufacture of plastics filled with other materials endowing the resulting composite with relatively high thermal or electrical conductivity.

As used herein, the term plastic includes both thermoplastic and thermosetting materials in all ranges of resiliency. Thus, it includes all types of elastomers, as well as the harder, less stretchable plastics. A resin is considered flowable when particles thereof will bind themselves to each other to form a homogeneous piece in which the individual particles have lost their separate identities. Thus, in the case of thermosetting materials, the uncured plastic is flowable and the cured or cross-linked plastic is nonflowable. The flowable material may be flowable by virtue of liquidity (e.g. at an elevated temperature) or because it is in the suspended form as in a plastisol.

Plastics loaded with electrically conducting particles have been used in a variety of applications where electrical conductivity is desired. They are preferred to purely metallic elements where the weight or cost of the latter is an important factor. Also, they can often be molded into a variety of shapes at lower cost than their purely metallic counterparts.

Another use of these filled plastics is in conductive gasketing. The plastic in this case is generally compressible so that the resulting gasket can be compressed to provide a liquid or airtight seal between a pair of mating parts, as well as electrical conduction between them. An example of this application is the gasketing between the flanges of wave guides, where the loaded plastic must exhibit high electrical conductivity and must also be opaque to the electromagnetic energy in the wave guide so as to act as an effective part of the wave guide structure. In similar circumstances, the material is used as a radio frequency shield because of its opacity at the frequencies concerned.

Electrically conductive plastic articles are also used as static eliminators in explosive atmospheres. In particular, they are used as shoe soles or disposable boots in explosive factories and even in surgical operating rooms, where sparking is a serious hazard. The material used in static suppression are generally much lower in cost than those used in radio frequency applications, since they are often embodied in disposable articles and neither high conductivity nor radio frequency opacity are required for spark suppression.

2. Prior Art

U.S. pat. No. 3,140,342 describes one of the prior methods used in making conductive plastic articles having radio frequency shielding capabilities. Metallic particles are mixed with the uncured phase of a compressible resin and the mass is then cured. Particle-to-particle contact provides numerous conductive paths through the cured article, with a resulting high conductivity. However, the cost of the conductive plastic is rather high because of the high concentration of metal therein, particularly when an expensive metal such as silver is used. Moreover, with a high metallic concentration, many of the desirable physical properties of the plastic are greatly attenuated. Thus, the finished article may not have as much tensile strength as desired, and its compressibility is greatly diminished by the large number of interconnecting metal particles.

U.S. Pat. No. 3,003,975 describes another arrangement in which uncured particles of a thermosetting resin are coated with metal particles and then pressed together and cured in a mold. The resin flows when the material is cured and this interrupts many of the otherwise continuous conducting paths in the finished article unless a relatively large amount of metal is used.

OBJECTS OF THE INVENTION

An object of the invention is to provide a novel method for manufacturing electrically conductive plastic materials.

Another object is to provide a method of manufacturing conductive plastic materials suitable for radio frequency shielding.

Yet another object of the invention is to provide a method of the above type characterized by relatively low cost and relatively high retention of the physical properties of the plastic matrix containing the conductive filler.

A still further object of the invention is a method that provides materials of the above type that are compressible and thus suitable as electrically conductive gasketing materials.

Another object of the invention is a method that provides plastic material characterized by relatively high thermal conductivity, relatively low cost and substantial retention of desirable physical characteristics of the plastic.

It is another object of the invention to provide a method of making plastic articles having the foregoing properties.

A further object of the invention is to provide an improved conductive plastic caulking material.

Other objects of the invention will in part be obvious and will in part appear hereinafter.

The invention accordingly comprises the several steps and the relation of one or more of such steps with respect to each of the others and a novel composition of matter, all as exemplified in the detailed disclosure hereinafter set forth, and the scope of the invention will be indicated in the claims.

SUMMARY OF THE INVENTION

In brief, a conductive plastic made in accordance with the invention incorporates a matrix binder whose starting material includes both a flowable resin and particles of a nonflowable resin, as well as particles of the conducting medium. After the ingredients are mixed, the flowable resin is then hardened to render it nonflowable. The result is a self-sustaining plastic article in which the conductive particles form a network extending throughout the article and thereby providing uniformly good conductivity throughout.

The flowable resin is preferably one that will chemically bond to the nonflowable particles when it is hardened; it is therefore preferably, though not necessarily, the uncured phase of a thermosetting resin. The nonflowable particles are preferably the cured phase of the same resin. Accordingly, in the preferred version of the invention, particles of a cured resin and conductive filler are mixed with the uncured resin and then molded or otherwise formed under the conditions required to cure (harden) the uncured resin. Chemical bonding of the previously uncured resin to the previously cured resin then provides a monolithic mass of plastic matric binder holding in place the conductive filler.

During hardening of the mixture, sufficient pressure is ordinarily applied to distort the nonflowable particles and thereby fill voids between them. For this purpose the nonflowable particles must be compressible and "compressibility," as the term is applied to these particles, means that they are sufficiently distortable to largely fill the interstices between them under pressure. That is, the distortion results in a fairly closely packed structure of the particles. Hardening of the flowable resin than maintains the distortion of the nonflowable particles and thus prevents the formation of undesirable voids between them. If the particles will not distort sufficiently to pack closely, significantly more of the conductive filler and flowable resin is required to achieve good physical properties and low porosity in the finished article. In a electrically conductive article, this means that the conductive particle density in these spaces must be great enough to ensure particle-to-particle contact throughout most of the conductive network.

Compressibility in the nonflowable particles serves the additional function of enhancing compressibility in the finished product. Preferably, these particles are also resilient, i.e. self-restoring, so as to provide substantial resilience in products such as gaskets made in accordance with the invention.

Articles, such as gaskets, made in accordance with the invention, may be molded to final form during hardening. Alternatively, they may be die cut from sheets or they may be extruded.

The mixture may also be hardened in place and thus used as a caulking compound. For this purpose, the flowable resin is ordinarily an uncured thermosetting resin. All the ingredients except the curing agent for uncured resin are premixed. The curing agent is then added just prior to the caulking step to cure the mixture.

While the flowable resin is preferably the uncured form of a thermosetting resin, it may also be a thermoplastic resin. In the latter case, it may be in the form of a plastisol or otherwise. The mixture of flowable resin, nonflowable resin and conductive particles is then heated to a temperature at which the flowable resin will flow and the nonflowable resin will not. Sufficient pressure is applied and the mixture is then cooled to harden the thermoplastic flowable resin.

The invention provides a relatively even dispersion of the metallic filler in the macrostructure, e.g. when comparing one volume of a hundred or more of the previously nonflowable resin particles with another volume of the same size. Yet there is a relatively low overall metal concentration, and consequently, high conductivity can be obtained without undue impairment of such desirable physical properties as strength and resilience.

This should be contrasted with the mixing of the metallic particles with only a flowable resin such resulting smaller plastisol. The particles tend to settle with a resulting concentration and lower conductivity near the top of the mass. To provide a high enough conductivity at the top, there must be a relatively high overall concentration of the metal. This results in a relatively high weight and significant diminution of physical properties, as well as a high cost where such metals as silver are used.

On the other hand, with the present invention the nonflowable resin particles largely prevent the metal from settling. Thus, a sufficiently high metallic concentration can be maintained near the top without a substantially larger concentration near the bottom of the mass. Moreover, in a thermosetting system bonding of the liquid (flowable) resin to the precured (nonflowable) particles during the curing process tends to "dry up" the liquid. That is, the resin being cured tends to pull away from the interstices between the previously cured particles, leaving portions of the metallic surfaces exposed for reliable metal-to-metal contact. This further permits a lower metal concentration than in an arrangement starting with only flowable resin, where the hardening resin tends to envelop all of the metallic particles.

The invention should also be contrasted with the use of uncured thermosetting resin particles as in U.S. Pat. No. 3,003,975, discussed above. Unlike uncured particles, the cured particles employed in accordance with the present invention do not flow during molding or curing of the uncured resin. Thus, there is minimal interruption of the conducting paths in the interparticle interstices. This is one fundamental reason why a low overall metal concentration is feasible with the present invention.

The foregoing advantages are obtained even when the nonflowable plastic particles are of relatively small size, e.g. the same size as the metal particles. Still greater reduction in metallic concentration is possible when nonflowable resin particles of substantially larger size are used. For example, with resin particles of 30 mesh and silver flake particles of less than 325 mesh, an electrically conductive material suitable for shielding at microwave frequencies was made with an overall concentration of only 1.5 percent (volume) of the metal. This provides a considerable cost saving when metals such as silver are used. Moreover, the weight is substantially reduced, a particular advantage in airborne and space vehicles.

With the large resin particles, the metallic particles are in effect constrained into a three-dimension conductive network in the interstices between the resin particles. The system is therefore highly conductive in these interstices and the mass consequently has a high macrostructure conductivity, even though a large portion of the volume may contain no metallic particles whatsoever. Moreover, elimination of the metal from these portions results in an overall low metallic concentration although of course, there is a substantial concentration in the conductive network. This arrangement still further increases the retention of desirable physical properties of the plastic. THis is particularly important in the case of compressible materials, including elastomers used in the fabrication of conductive gaskets.

Since the foregoing method of manufacture results in relatively few interruptions in the conductive network, the branches of the network are on the whole very short, and the system therefore operates as a homogeneous conductive mass at radio and microwave frequencies.

When better thermal conductivity is the desired property, a less expensive conducting medium can be substituted for the silver used in electrically conducting plastic articles. For example, aluminum flakes and powder, which are ordinarily undesirable for electrically conducting plastics because of the high resistivity of the oxide coating, are quite suitable for thermally conductive plastics. As another example, particles of alumina may be used as the filler providing improved thermal conductivity. For the purpose of thermal conductivity a "conductive" filler has the thermal conductivity of a metal as contrasted with the much lower conductivity of an unfilled plastic. The thermal conductivity of a plastic can ordinarily be at least doubled by incorporating a conductive filler.

In either the electrically conductive or thermally conductive material, when the conductive filler is in the form of flakelike particles, an additional filler can be added as an extender. Round particles of a material such as alumina can be included for this purpose. An extender is particularly useful where there is a relatively large flowable resin content, corresponding to a relatively large volume in the interstices between nonflowable resin particles.

On the other hand, it appears that where ratio of flowable resin is relatively small, an extender is normally of little use. The invention does not depend on the reason for this. However, the results we have obtained seem to indicate that the interstices between the nonflowable particles are relatively small after compression of the mixture and the conductive flakes thus tend to lay flat on the surfaces of the resin particles (assuming that the latter are larger than the flakes). In essence, the flakes form metallic coatings that contact each other because of close proximity of adjacent resin particles. Consequently, less conductive filler is required and an extender will not appreciably reduce further the amount needed.

Ordinarily we prefer to mix the ingredients in succession rather than all at once. That is, the flowable resin and nonflowable resin particles are first mixed together and then the conductive filler is mixed in along with extender particles if the latter are used. This provides thorough coating of the nonflowable resin by the flowable resin and thereby enhances bonding of the nonflowable particles when the flowable resin is hardened.

The thermally conductive plastics will be particularly useful in facilitating conduction between electronic components or similar articles and heat sinks used to maintain such components within safe temperature limits. The use of a compressible and resilient conductive plastic ensures good thermal contact with both the component and the heat sink. This feature will be especially appreciated when there is curvature in on e or both of the surfaces between which heat conduction is to be maintained. Also, in many cases the component must be electrically isolated from the heat sink and an insulating spacer is normally interposed between them for this purpose. By using a thermally conductive, electrically nonconductive filler, one may readily fabricate a thermally conductive plastic meeting this requirement.

In a plastic article incorporating silver flake for electrical conductivity, the proportion of metal may be even less than one percent (volume) in the final product, although, ordinarily, a proportion of at least 1.5 percent is preferred to ensure sufficient metal-to-metal contact in the conductive network. The amount of metal can range upward to 45 percent. Above this level, the metallic filler unduly degrades the desirable qualities of the plastic, particularly resilience when the latter is an elastomer. Actually, a much lower level is generally preferred so as to minimize the effect on these characteristics.

The following examples illustrate the practice of the present invention.

EXAMPLE I

Nine parts silicone resin (liquid) marketed by General Electric Company under the designation RTV 615A were mixed with one part catalyst (General Electric RTV 615B), and the mixture was cured at 150° C. for 15 minutes. The cured resin was rubbery; it had a hardness of 40 Shore A durometer and a tensile strength of 1000 p.s.i. The cured resin was then comminuted to particles having an average size of approximately 30 mils (0.030 inch) diameter.

The following ingredients were then thoroughly mixed together:
a. 2 g. of the foregoing cured particles;
b. 3.0 g. of the same uncured resin and catalyst in a 9:1 ratio;
c. 3.5 g. of alumina particles, approximately 325 mesh (Alcoa T61); and
d. 5 g. silver flake, smaller than 325 mesh (Handy & Harman, Silflake 135 (Batch 760)).

This mixture was cured at a temperature of approximately 285° F. for 30 minutes while under slight pressure, resulting in a sheet having a diameter of three inches, a thickness of approximately 0.060 inch and a silver content of 7.8 percent (volume). A simple resistance measurement between two points at opposite ends of a diameter provided a reading of 0.6 ohm. (All of the electrical conductivity characteristics were determined by means of point-to-point resistance measurements.)

EXAMPLE II

An elastomeric epoxy was formed by mixing together 8.2 g. polyether diprimary amine (3M Company, HC-1101), 0.23 g. 2, 4, 6-tris (dimethylaminomethyl) phenol catalyst (Rhom & Haas Co., DMP-30), allowing the mixture to cool to room temperature and then adding 1.8 g. epoxy resin (Dow Chemical Company, DER 330). The mixture was cured at 310° F. for 20 minutes and the cured resin was then comminuted to an average particle size of approximately 20 mil.

Then the following ingredients were mixed together:
a. 2 g. cured particles;
b. 2.6 g. polyether diprimary amine (HC-1101);
c. 0.04 g. catalyst (DMP-30);
d. 0.36 g. epoxy resin (DER 330)
e. 6 grams alumina particles (Alcoa T61); and
f. 5 g. silver flake (Silflake 135).

The mixture was placed in a cardboard chase disposed between the plates of a press and having a thickness of 0.080 inch; a sheet of aluminum foil was placed over the mixture. The plates were forced together to apply a pressure of approximately 200 p.s.i. while the mixture was cured for 20 minutes at a temperature of 310° F.

The resulting sheet was strong and it had good conductivity as well as very good adhesion to the aluminum foil. It had a silver content of 5.8 percent (volume).

After several days, this sheet exhibited substantially greater hardness than the other examples of the invention, e.g. example V. Indeed it would not be described as "compressible" as that term is ordinarily used. Yet the precured resin particles were originally quite compressible, and consequently they packed together closely, in the manner described above, when subjected to the pressured used during curing of the flowable resin (ingredients b, c and d)). The further curing (hardening) of these particles was due to takeup of the hardening agent contained in the uncured resin.

Alternatively, the particles might be made of a slow-curing composition that in itself continues to harden after the mixture is compressed. In either case, the method can thus provide hard conductive plastics that exhibit a great deal of the strength of their unfilled counterparts.

EXAMPLE III

The following ingredients were thoroughly mixed together:
a. 6 g. comminuted closed cell silicone foam (10 mils average size); prior to comminution the foam was in the form of a medium-density sheet (approximately 1 g./cc.) marketed by Greene Rubber Co.; it had a hardness of 20 Shore A;
b. 3 g. silicone gum stock comprising a silicone resin (Dow Corning Corporation, Silastic 35U) and dicumyl peroxide catalyst (Hercules Inc., Di-cup R) in the ratio 200:1 by weight;
c. 5 g. silver flake (Silflake 135);
d. 3.5 g. alumina particles (Alcoa T61).

The mixture was placed in a cardboard chase between the plates of a press and cured for thirty minutes at a temperature of 310° F. and pressure of approximately 240 p.s.i. The resulting sheet was postcured for 4 hours at 300° F. The cured sheet, which had a silver content of 4.7 percent (volume) was highly conductive. It had a hardness of 61 Shore A. By comparison, a similar sheet made without the cured silicone particles had a hardness of 75 Shore A. (The hardness measurements reported herein were made on stacked pieces having a total thickness of approximately 0.2 inch.)

The resin used in this example had the consistency of gunstock, and ordinarily, ingredients having this consistency are most readily mixed on a rubber calendar. A more liquid resin is therefore preferred as illustrated in the other examples described herein.

The use of foam particles should be contrasted with the use of a foaming agent in a conductive plastic otherwise made as in U.S. Pat. No. 3,140,342 i.e. without the precured resin particles. In the latter case a relatively high metallic content is still required. Moreover, while the foaming agent does result in increased compressibility, it does not ordinarily provide as much resilience as the present invention; that is, the compressed material does not ordinarily recover to the same degree after the compressive force is removed.

EXAMPLE IV

This example illustrates the use of silver powder instead of silver flake.

The following ingredients were mixed together:
a. 5 g. ground foam particles of the type used in example III:
b. 2.5 g. of silicone gum stock as used in example III;
c. 7.5 g. silver powder, approximately 1.5 micron average diameter (Handy & Harman, Silpowder 130).

The mixture was placed in a cardboard chase and cured therein for 30 minutes at a temperature of 310° F. and a pressure of approximately 240 p.s.i. It was then postcured for three hours at a temperature of 280° F.

The finished sheet exhibited excellent electrical conductivity. It had a hardness of 55 Shore A. By contrast, a similar sheet made without the precured particles had a hardness of 80 Shore A.

EXAMPLE V

This example consists of six samples which were made with varying proportions of the same ingredients. These ingredients were:
a. ground silicone foam, as in example III;
b. uncured General Electric RTV 615A silicone resin and 615B catalyst in a 9:1 weight ratio;
c. a silver flake (Silflake 135);
d. alumina particles (Alcoa T61).

The amounts of the various ingredients and the resulting silver content were as follows:

|  | V.1 | V.2 | V.3 | V.4 | V.5 | V.6 |
| --- | --- | --- | --- | --- | --- | --- |
| (a) Foam particles, gms | 2 | 6 | 10 | 15 | 10 | 8 |
| (b) Uncured resin, gms | 3 | 3 | 3 | 3 | 1 | 2 |
| (c) Silver flakes, gms | 5 | 5 | 5 | 5 | 1.6 | 1.7 |
| (d) Alumina particles, gms | 3.5 | 3.5 | 3.5 | 3.5 | 1.2 | 1.7 |
| (e) Volume percent silver, gms | 7.6 | 4.6 | 3.2 | 2.4 | 1.3 | 1.5 |

In each case the ingredients were mixed and poured into a cardboard chase disposed between the plates of a press. The mixture was then cured for 45 minutes at a temperature of 275° F. and a pressure of approximately 240 p.s.i. to form a sheet having the thickness of a typical gasket. All of the cured sheets had excellent electrical conductivity except for V.6, which was only mediocre in this respect. Moreover, they were resilient. The following hardnesses were measured:

V.1–47 Shore A;
V.4–43 Shore A;
V.5–37 Shore A;
V.6–41 Shore A;

EXAMPLE VA

This example consists of four samples using the same ingredients as example V, except that the alumina particles were omitted. The procedure was the same in example V, although the curing conditions were somewhat different, the sheets being cured for 15 minutes at a temperature of 330° F. and a pressure of approximately 240 p.s.i. The amounts of the various ingredients and the resulting silver content and hardness of the finished sheets were as follows:

|  | VA.1 | VA.2 | VA.4 | VA.7 | VA.8 |
| --- | --- | --- | --- | --- | --- |
| (a) Foam particles, gms | 6 | 6 | 15 | 1.5 | 0 |
| (b) Uncured resin, gms | 9 | 3 | 3 | 9 | 9 |
| (c) Silver flakes, gms | 9 | 3 | 3 | 9 | 9 |
| (e) Volume percent silver, gms | 5.5 | 3.1 | 1.6 | 7.8 | 9 |
| (f) Hardness (Shore A), gms | 40 | 38 | 38 | 45 | 45 |

Sample VA.4 exhibited excellent conductivity. Samples VA.1 and VA.2 were somewhat less conductive than VA.4. Sample VA.7 appeared to be about as conductive as VA.1 and VA.2, but the conductivity was not uniform throughout the sheet. Sample VA.8 exhibited spotty conductivity, and in the conductive regions had a noticeable higher resistance than the other samples.

samples VA.1, VA.2 and VA.4 had the same relative proportions of cured particles and uncured resin as their like numbered sampled in example V. The silver content was 40 percent less than in example V. Yet, in the case of sample VA.4 the electrical conductivity was at least as good. This appears to support the theory that when a large proportion of cured resin particles are used, the silver flakes tend to lie flat on the resin particles, and this, together with the close proximity of the resin cured particles to each other, provides conductivity with a minimum amount of conductive filler. With a larger proportion of uncured resin, the cured particles are separated to some extent by the uncured resin and additional conductive filler must be provided to establish conductivity through the uncured resin. In the latter situation, the extender (alumina) particles help in keeping dow the amount of conductive filler needed to establish the requisite conductivity.

Elimination of the alumina particles and reduction in the silver content reduce the weight and expense of the conductive plastic. They also improve other desirable physical characteristics. Thus, comparison of samples VA.1 and VA.4 with samples V.1 and V.4 shows a marked increase in compressibility when the amounts of these components are reduced. The compressibility depends also, of course, on the proportion of the compressible, precured particles included in the plastic, which is why samples V.4 and VA.4 were substantially more compressible than samples V.1 and VA.1.

EXAMPLE VB

This example consists of two samples, VB.2 and VB.4, which were exactly the same as samples V.2 and V.4, except that silver powder (Silpowder 130) was substituted for the silver flake. Sample VB.2 had a hardness of 58 Shore A. It exhibited less conductivity than sample V.2, but had greater elongation and greater tensile strength. Sample VB.4 was not electrically conductive. It had a hardness of 45 Shore A.

These samples indicate a difference between the powder and flake forms of the conductive filler. Again, it appears that the flakes tend to form continuous coatings over the precured resin particles, as contrasted with the powder which apparently does not.

EXAMPLE VI

In this example, the ingredients were the same as in example V, except that ingredient (b) comprised the uncured resin, the catalyst and also a diluent (General Electric RTV 910) in the weight ratio 4.5:0.5:5. The ingredients were mixed in the following proportions:

a. 10 Hg. cured foam particles;
b. 2 g. uncured resin components;
c. 1.67 g. silver flake;
d. 1.33 g. alumina particles The mixture was then cured under the same conditions as in example IV. The resulting sheet had a silver content of 1.3 percent (volume). It had good electrical conductivity and a hardness of 32 Shore A. A comparison with example V.5, in which the proportions of the various ingredients were almost exactly the same except for the addition of the diluent in example VI, indicates that the diluent significantly increases the compressibility.

EXAMPLE VII

This example illustrates the use of a urethane system. The precured resin was formed from the following ingredients:

a. 50 g. hydroxy terminated copolymer of butadiene and styrene (Sinclair Chemical Co., PolyB–D CS–15);
b. 3.45 g. Isonol C–100 diol (Upjohn Company);
c. 9.5 g. isocyanate (Upjohn Isonate 143L);
d. 0.05 g. 50 percent stannous octylate catalyst (Naftone, Inc.).

The foregoing ingredients were cured for one hour at a temperature of 115° C. and the cured material was then comminuted to a particle size of approximately 5 mils.

The uncured resin in this example included all the ingredients of the cured resin, together with a plasticizer in the weight ratio 1:2. The plasticizer was a rubber process oil marketed by Sinclair Chemical Co. under the designation Tufflo 300. The various ingredients of the gasket material were then mixed together in the following amounts:

a. 10 g. cured resin particles;
b. 3 g. uncured resin;
c. 1.67 g. silver flake (Silflake 135);
d. 1.3 g. alumina particles (Alcoa T61).

The mixture was then poured into a cardboard chase and cured therein for 45 minutes at a temperature of 270° F. and a pressure of approximately 320 p.s.i.

The resulting sheet had a silver content of 1.1 percent (volume). It exhibited good electrical conductivity and had a hardness of 44 Shore A.

EXAMPLE VIII

This example illustrates the use of a screen as a reinforcing agent in a gasket. The ingredients of example V were mixed together in the following proportions:

a. 7.5 g. ground silicone foam;
b. 1.5 g. silicone uncured resin plus catalyst;
c. 2.5 g. silver flake;
d. 1.8 g. alumina particles These ingredients were mixed together and then pressed into an expanded screen marketed by Exmet Corp. (2 Inconel 9-2/OE). The composite was then cured for 45 minutes at a temperature of 265° F. and a pressure of approximately 240 p.s.i. to yield a sheet having a silver content of 2.5 percent (volume).

EXAMPLE IX

This example illustrates the use of a thermoplastic material as the flowable resin.

The following ingredients were thoroughly mixed:
a. 9 g. of the cured urethane particles used in example VII;
b. 3 g. thermoplastic urethane rubber (B. F. Goodrich Co., Estane 5702);
c. 5 g. silver flake (Silflake 135);
d. 3.5 g. alumina particles (Alcoa T61).

The material was placed in a cardboard chase and subjected to a temperature of 270° F. and pressure of approximately 400 p.s.i. for 3 minutes. Under these conditions, the thermoplastic material flowed freely within the interstices between the cured particles.

The mixture was then cooled to harden the thermoplastic. The resulting sheet had a silver content of 2.9 percent (volume).

EXAMPLE X

This example illustrates the use of cured particles which are in themselves electrically conductive.

The precured material was formed by curing the following mixture:
a. 36 g. silicone resin (General Electric Co., RTV 615A);
b. 4 g. catalyst (General Electric RTV 615B);
c. 10 g. carbon black (Cabot Corporation XC–72R).

The cured material was comminuted to provide particles of approximately 15 mils.

The following ingredients were then mixed together:
a. 8.1 g. cured resin particles;
b. 3.94 g. of a mixture of silicone resin and catalyst in the ratio of 9:1 by weight (General Electric RTV 615A and 615B);
c. 5.3 g. of silver flake (Silflake 135);
d. 4 g. alumina particles (Alcoa T61).

The mixture was poured into a cardboard chase and cured therein for 20 minutes at a temperature of 310° F. and a pressure of approximately 240 p.s.i.

The resulting sheet, which had a silver content of 4 percent (volume) exhibited excellent electrical conductivity; it had a hardness of 51 Shore A. The carbon black renders the cured particles conductive. Yet, the presence of the carbon in the particles does not unduly harden them as indicated by the relative compliance of the material.

EXAMPLE XI

This example illustrates the use of copper shot in an electrically conducting plastic embodying the invention.

The following ingredients were mixed together:
a. 6 g. cured silicone foam particles of the type used in example III;
b. 3 g. uncuresilicone resin comprising General Electric RTV 615A resin and RTV 615B catalyst in a 9:1 weight ratio;
c. 57 g. copper shot, average size 25 mesh (Alcan Metal Powders, Inc., MD23HP).

The mixture was placed in a cardboard chase and cured therein for 40 minutes at a temperature of 265° F. and a pressure of approximately 320 p.s.i. conductivity.

The resulting sheet had a copper content of approximately 42 percent (volume) and exhibited good electrical conductivity under pressure. In the absence of pressure, the conductivity was not so good, because of the oxide coating of the copper particles. This coating is penetrated by the particles when pressure is exerted on the sheet, a condition ordinarily imposed on gaskets during use.

EXAMPLE XII

This example illustrates the use of copper wire as the conducting medium and a plastic article made in accordance with the present invention.

The following ingredients were mixed together:
a. 4 g. cured silicone resin particles of the type used in example I;
b. 1 g. uncured silicone resin of the type used in example I;
c. 0.3 g. copper wire, 0.0016 inch diameter ×6 inches long.

The mixture was placed in a cardboard chase and cured therein for 45 minutes at a temperature of 270° F. and a pressure of approximately 200 p.s.i.

The resulting sheet had a copper content of approximately 0.7 percent (volume). When electrical conductivity was sensed by point-to-point measurement, the sheet exhibited good conductivity between points where the wires projected through the surface of the sheet. It should be noted that when the material is used as a gasket, a great many of these projections contact the surfaces between which the gasket is to provide a seal.

EXAMPLE XIII

This example illustrates the use of carbon black as the medium providing electrical conductivity.

The following ingredients were mixed together:
a. 6 g. silicone foam of the type used in example V;
b. 3 g. uncured silicone resin of the type used in example V;
c. 1.2 g. carbon black (Cabot Corp. XC–72R).

The mixture was cured in a cardboard chase for 45 minutes at a temperature of 265° F. and a pressure of approximately 320 p.s.i. The resulting sheet had a carbon black content of approximately 6.8 percent (volume). It had the conductivity of a typical carbon black system, with the increased compressibility provided by the use of precured foam particles as part of the binding matrix for the carbon black.

EXAMPLE XIV

This example illustrates the use of stainless steel fibers in providing electrical conductivity.

The following ingredients were mixed together:
a. 20 g. cured silicone particles loaded with carbon black as described in example X;
20 g. uncured resin comprising Silastic 35U resin and DI-CupR catalyst in the ratio 200:1 by weight;
c. 6.67 g. stainless steel fiber, 12 micron diameter ×⅛ inch (Brunswick Corp. 710SC272);
d. 2 g. titanium dioxide whitener (New Jersey Zinc Co. A–430).

The mixture was cured in a cardboard chase for 20 minutes at a temperature of 310°°F. and a pressure of approximately 240 p.s.i. It was then postcured at a temperature of 285° F. for 4 hours.

The resulting sheet had an electrical conductivity similar to that of a carbon black system, e.g. the sheet described in example XIII. However, instead of the dark color characteristic of the carbon black systems, a color which is sometimes objectionable, the system had a grey color resulting from the inclusion of the titanium dioxide. In a system of this type, the use of fibrous, rather than particulate, metallic filler is desirable, since intermetallic conduction is interrupted less by the titanium dioxide than would be the case with flake or spherical metallic particles.

EXAMPLE XV

This is an example of a thermally conductive, compressible plastic embodying the present invention.

The following ingredients were mixed together:
a. 6 g. cured silicone resin particles of the type used in example I;
b. 3 g. uncured resin of the type used in example I;
c. 6.9 g. aluminum powder (Alcoa 120).

The mixture was placed in a cardboard chase and cured therein for 15 minutes at a temperature of 270° F. and a pressure of approximately 200 p.s.i.

The resulting sheet had an aluminum content of approximately 26 percent (volume). It had a hardness of 56 Shore A and exhibited good thermal conducting properties.

EXAMPLE XVI

This example illustrates the use of a flowable resin that becomes hard when cured. The following ingredients were mixed together:
  a. 2 g. cured particles of the type used in example II;
  b. uncured resin comprising 1 g. epoxy (DER 330) and 2 g. polyamide (General Mills Corp., Versamid 125);
  c. 8 g. silver flake (Silflake 135).

The mixture was placed in a 40 mil thick cardboard chase and cured therein for 15 minutes at a temperature of 200° F. and a pressure of approximately 200 p.s.i. The resulting sheet was hard and rigid relative to the foregoing examples. It had good electrical conductivity.

It will thus be seen that the objects set forth above, among those made apparent from the preceding description, are efficiently attained and, since certain changes may be made in carrying out the above process and in the composition and article se forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method of making a conductive plastic article, said method comprising the steps of forming a mixture of (a) pressure-distortable, nonflowable resin particles of a cured thermosetting resin, with (b) a flowable resin and (c) a filler selected from the group consisting of carbon black and a metal while maintaining the particles in particulate form, and then hardening the mixture.

2. A method as defined in claim 1 wherein the nonflowable particles are chemically bonded to the flowable resin.

3. The method defined in claim 1 in which
   A. said nonflowable particles are of a cured thermosetting resin;
   B. said flowable resin is an uncured thermosetting resin, and
   C. hardening is accomplished by curing said uncured resin.

4. The method defined in claim 1 in which said particles are particles of a pressure-distortable foam.

5. The method defined in claim 3 in which said particles are resilient.

6. The method defined in claim 1 in which said nonflowable resin particles are resilient.

7. The method defined in claim 1 in which said nonflowable particles contain sufficient carbon black to provide electrical conductivity therein.

8. The method defined in claim 3 in which said filler is an electrically conducting filler.

9. The method defined in claim 8 in which said nonflowable resin particles contain sufficient carbon black to provide electrical conductivity therein.

10. The method defined in claim 1 in which the mixing step is accomplished by first mixing said flowable resin with said nonflowable resin particles and then adding said filler.

11. The method defined in claim 3 in which the mixing step is accomplished by first mixing said flowable resin with said nonflowable resin particles and then adding said filler.

12. The method defined in claim 1 in which said mixture is compressed during hardening, thereby to compress said pressure-distortable particles and reduce the interstices between them.

13. The method defined in claim 3 in which said mixture is compressed during hardening, thereby to compress said pressure-distortable particles and reduce the interstices between them.

14. The method defined i claim 1 in which said filler is a metallic filler in sufficient amount to provide electrical conductivity through said plastic article.

15. The method defined in claim 14, in which the proportion of said filler in said mixture is from 1 percent to 45 percent by volume.

16. The method defined in claim 14 in which said filler is in the form of flakelike particles sufficiently smaller than said nonflowable resin particles to form conductive coatings on said resin particles.

17. The method defined in claim 14 in which said filler is in the form of metallic fibers.

18. The method defined in claim 17 in which said nonflowable resin particles contain sufficient carbon black to render them electrically conductive.

19. The method defined in claim 18 in which said filler is in the form of stainless steel fibers.

20. The method defined in claim 3 in which said nonflowable particles are further cured after compression thereof, to provide a relatively incompressible plastic article.

21. A method of making an electrically conductive plastic article, said method comprising the steps of
   A. providing a first mixture of pressure-distortable, cured thermosetting resin particles and an uncured thermosetting resin,
   B. providing a second mixture comprising said first mixture and metallic particles sufficient in quantity to provide electrical conductivity in said article,
   C. applying pressure to said second mixture thereby to distort said cured particles and reduce the interstices between them,
   D. curing said uncured resin while said second mixture is under pressure, and
   E. forming said article from said second mixture.

22. The method defined in claim 21, in which said forming step is accomplished by curing said uncured resin while said mixture is in a mold conforming to the shape of said article.

23. The method defined in claim 21 in which said forming step is accomplished by extruding said second mixture during the curing of said uncured resin.

24. The method defined in claim 21 in which said uncured resin is a rein that chemically bonds to said cured resin particles, thereby to provide a monolithic matrix binder for said conducting filler.

25. The method defined in claim 24 in which said cure particles are of a silicone resin and said uncured resin is a silicone resin.

26. The method defined in claim 25 in which said cured particles are particles of the pressure-distortable silicone foam.

27. An electrically conducting caulking mixture comprising the mixture of
   A. nonflowable, pressure-distortable rein particles, formed of a cured thermosetting resin.
   B. flowable resin, and
   C. metallic particles sufficient in quantity to provide electrical conductivity through said mixture after hardening said flowable resin.

28. A mixture for making a n electrically conducting plastic article, said mixture comprising
   A. nonflowable pressure-distortable resin particles formed of a cured thermosetting resin
   B. flowable, hardenable resin, and
   C. metallic particles sufficient in quantity to provide electrical conductivity through said mixture after hardening of said flowable resin.

29. A method of making a conductive plastic article, said method comprising the steps of
   A. coating particles of a pressure-distortable, nonflowable resin formed of a cured thermosetting resin with particles selected from the group consisting of carbon and metal particles, and
   B. binding the coated particles under compression by means of a bonding medium that chemically bonds to the material of said particles.

30. A method of making a conductive plastic article, said method comprising the steps of forming a mixture of a. pressure-distortable nonflowable resin particles of a cured thermosetting resin, with
b. a flowable resin and
c. alumina as a thermally conductive filler, while maintaining the particles in particulate form, and then hardening the mixture.